United States Patent
Burrell

(10) Patent No.: US 6,411,502 B1
(45) Date of Patent: *Jun. 25, 2002

(54) PORTABLE ELECTRONIC DEVICE FOR USE IN COMBINATION PORTABLE AND FIXED MOUNT APPLICATIONS

(75) Inventor: Gary L. Burrell, Olathe, KS (US)

(73) Assignee: Garmin Corporation (TW)

( * ) Notice: Subject to any disclaimer, the term of this patent is extended or adjusted under 35 U.S.C. 154(b) by 0 days.

This patent is subject to a terminal disclaimer.

(21) Appl. No.: 09/951,043

(22) Filed: Sep. 12, 2001

Related U.S. Application Data

(60) Continuation of application No. 09/160,510, filed on Sep. 25, 1998, which is a division of application No. 08/557,521, filed on Nov. 14, 1995, now Pat. No. 5,910,882.

(51) Int. Cl.⁷ .............................. G06F 1/16; H05K 5/00
(52) U.S. Cl. ...................... 361/681; 361/680; 200/308; 400/88
(58) Field of Search ................................ 361/681–686; 400/88, 493; D14/150, 151; 200/308, 314; 345/126, 169, 172, 905; 463/37

(56) References Cited

U.S. PATENT DOCUMENTS

| | | | |
|---|---|---|---|
| 4,120,037 A | 10/1978 | Sato | 361/681 X |
| 4,237,540 A | 12/1980 | Sato | 361/681 X |
| D301,882 S | 6/1989 | Watanabe | |
| D302,271 S | 7/1989 | Watanabe | |
| D326,450 S | 5/1992 | Watanabe | |
| 5,133,076 A | 7/1992 | Hawkins et al. | 364/709 X |
| 5,134,390 A | 7/1992 | Kishimoto et al. | 345/126 |
| 5,146,231 A | 9/1992 | Ghaem et al. | 342/419 |
| 5,189,404 A | 2/1993 | Masimo et al. | 340/720 |
| 5,204,817 A | 4/1993 | Yoshida | |
| D337,582 S | 7/1993 | Lewo | |
| 5,267,181 A | 11/1993 | George | 364/708.1 X |
| 5,297,051 A | 3/1994 | Arakawa et al. | |
| 5,416,666 A | 5/1995 | Maguire, Jr. | 361/681 |
| 5,661,632 A | 8/1997 | Register | 361/683 |
| 5,665,000 A | 9/1997 | Burrell et al. | 463/46 |
| 5,850,612 A | 12/1998 | Kulberg et al. | 455/550 |

FOREIGN PATENT DOCUMENTS

JP 07055910 3/1995

*Primary Examiner*—Lynn D. Feild
(74) *Attorney, Agent, or Firm*—Devon A. Rolf

(57) ABSTRACT

A portable electronic device is provided which includes a housing having a front face, a base, and a back wall joined in a polyhedron configuration. The front face includes an input area having keys for data entry and a display area having a screen to illustrate information to the user. The front face, back wall, and base are joined in the polyhedron configuration, such that the front face is presented to the user at an angle to horizontal when the base is mounted upon a horizontal or vertical surface. The front face, back wall, and base are joined at rounded edges to afford a smooth contour which is easily and comfortably grasped within the hand of the user. The portable electronic device further includes a sensor to determine whether the housing is aligned upon a horizontal or vertical axis. This sensor delivers its output to a display control which realigns information displayed upon the view screen to shift the displayed information between vertical and horizontal configurations. The input keys within the input area include indicia identifying the function of each key, wherein the indicia are aligned at an angle with respect to the longitudinal axis of the housing. Such angular alignment of the indicia enable the indicia to be easily viewed when the housing is held within the hand of a user at a vertical alignment or mounted upon a console in a horizontal alignment.

10 Claims, 5 Drawing Sheets

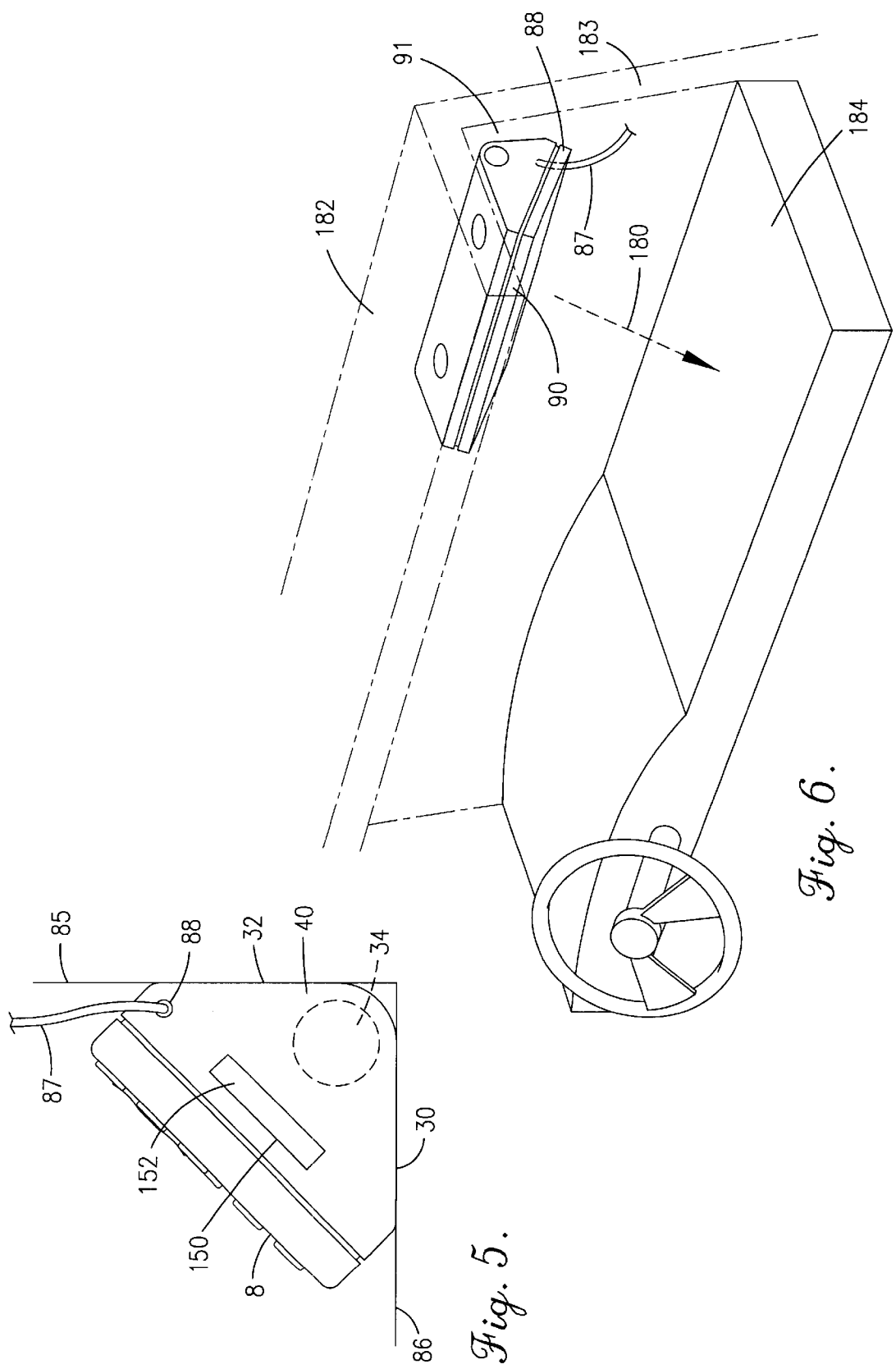

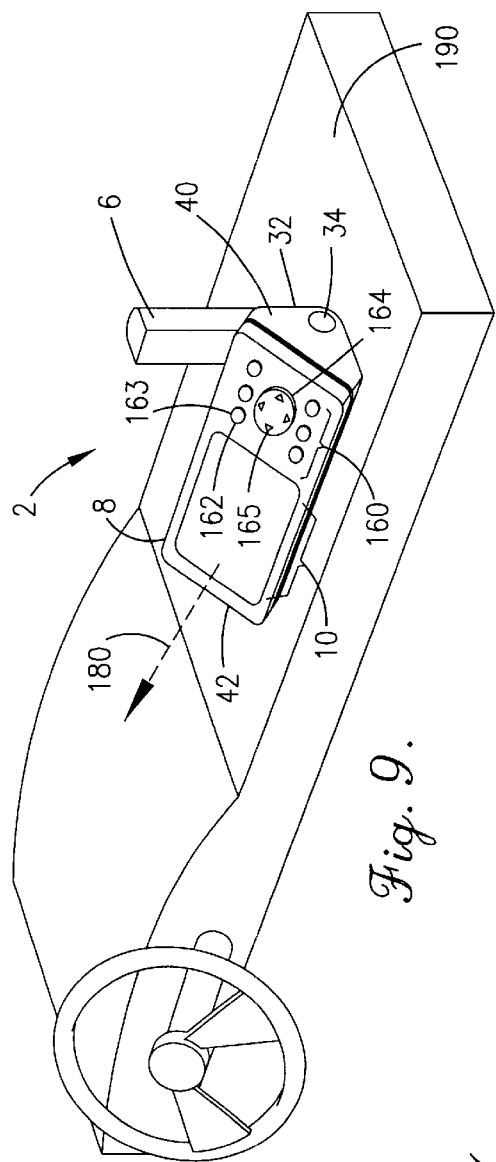
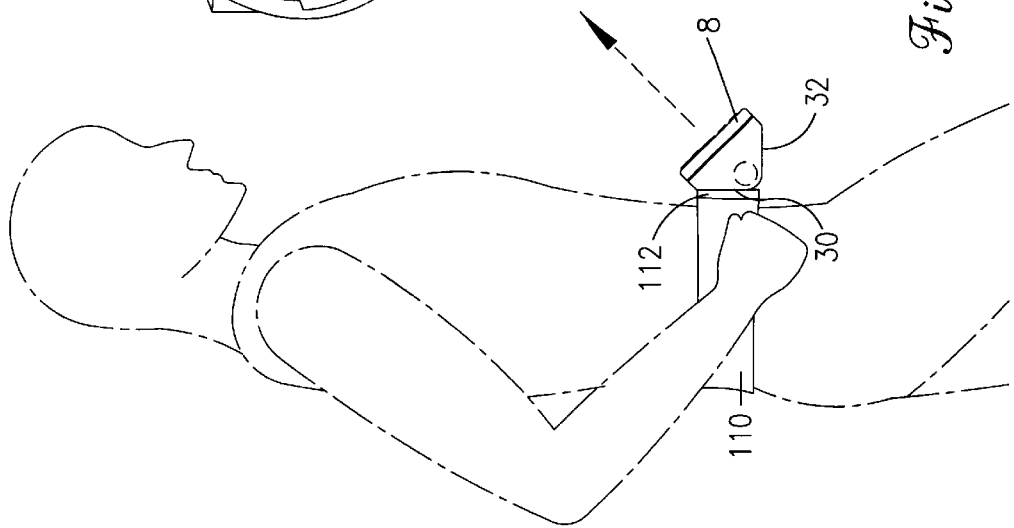

PORTABLE ELECTRONIC DEVICE FOR USE IN COMBINATION PORTABLE AND FIXED MOUNT APPLICATIONS

This application is a continuation of application Ser. No. 09/160,510, filed Sep. 25, 1998, which is a divisional of Ser. No. 08/557,521, filed Nov. 14, 1995, now U.S. Pat. No. 5,910,882.

BACKGROUND OF THE INVENTION

1. Field of the Invention

The field of the invention generally relates to portable and fixed mount electronic devices having control and data entry means such as keypads and/or rotary knobs and display screens. More specifically, the invention relates to an electronic device optimally configured for both fixed mounting and hand-held operation.

2. Description of the Related Art

Today, numerous types of electronics devices are available such as Global Positioning System (GPS) satellite navigation systems, communication transceivers, telephones, calculators, computers, personal digital assistants, personal organizers, and video devices such as television. The foregoing devices are generally designed for use in either a vertical orientation or horizontal orientation.

Electronic devices designed for optimum portable handheld operation are housed within a vertically aligned housing with a narrow width dimension on the order of 2–4 inches and with longer length dimensions on the order of 4–9 inches. This vertical alignment affords the most comfortable configuration to be held and the most convenient alignment for the entry of data and for viewing of a display screen. The above-noted vertically aligned electronic devices may also be designed to be carried within a belt mounted carrying case about a user's waist. When intended for such applications, the vertical alignment typically orients the portable electronic equipment to hang vertically from the user's waist. This is generally inconvenient to view or operate while walking or in a vehicle since the display and keypad are hanging down and not convenient to operate or see. In addition, while entering a vehicle, it is necessary to move the electronic device to a horizontal position to slide onto the vehicle seat.

Electronic devices designed for fixed mount applications, such as in or on an aircraft panel, boat panel, land vehicle panel and the like; are normally provided within a housing which is oriented to extend along a horizontal axis when mounted within the panel or console mounted on the panel. When fixed mounted in the panel, the horizontal alignment provides convenient accommodation of several different types of electronic devices to be stacked upon one another for best functionality and space utilization. Examples are AM-FM stereo, CD changer, cellular telephone, heat and air conditioning control panels in automobiles.

When console mounted on the panel, the horizontal orientation improves visibility by reducing obstructions to the user's field of vision and also minimizes tendencies for the device to tip over when bumped by the user or during abrupt maneuvers of the vehicle.

However, each of the two primary orientations experiences shortcomings which limit the broadest application of portable electronic devices.

Portable electronic equipment with horizontal orientation optimized for dash mounted and console mounted applications are inconvenient to use in hand-held applications. In particular, horizontally oriented devices are awkward and uncomfortable to hold and are equally awkward and uncomfortable for data entry and display viewing.

Portable electronic equipment with vertical orientation is inconvenient to mount in a car, boat or aircraft panel due to physical constraints of the panel itself and other electronic devices that are generally horizontally configured. Electronic devices with vertical orientation must be secured in a vertical mount when mounted on the top of the console in a boat, aircraft or land vehicle in order to be viewed and operated. However, often there is insufficient clearance to the windshield to accomplish same. When sufficient clearance is available, the device then protrudes into the line of vision partially blocking the vision and is more exposed to damage by bumping than a horizontal orientation.

If a vertically oriented portable device is not securely mounted to the console when in a vehicle, the device rests upon the console on its back thereby orienting the display screen directly upward from the console surface. Hence, the display is generally aligned along a horizontal plane which is difficult if not impossible to view unless the user looks directly downward upon the display screen. Further, electronic devices that are limited to line-of-sight reception such as GPS Navigation receivers, cannot simply be picked up from the dash by the user to view the display since, doing so, would block the line of sight signals from the satellites by the roof of the vehicle. In order to conveniently view and operate portable electronic equipment with vertical orientation and line of sight signal requirements while in a vehicle, a separate or detachable antenna is required to be placed on the console or outside the vehicle to allow the electronic device to be held in the hand or placed on the seat adjacent to the operator.

Belt-mounted devices, used by public service providers such as police officers, are inconvenient to use particularly when entering and exiting a vehicle. When the officer enters and exits the vehicle, the device must be lifted for clearance or removed from the belt before entering the vehicle. If the device is retained on the officer's belt while in the car, the device becomes inoperative and it is blocked from direct line of communication with signal's from source(s) passing through the glass windows. Generally, these disadvantages of a belt mounted device lead to officers using separate dash mounted communications devices in the car which leads to greater expense than if a single electronic device could perform both the portable and fixed mount applications.

Hence, a need remains within the industry for a single device which meets the needs and requirements for combination portable and fixed mount applications. It is an object of the present invention to meet these needs and requirements.

SUMMARY OF THE INVENTION

It is an object of the present invention to provide an electronic device which is useful in both portable and fixed mount applications.

It is a corollary object of the present invention to provide a single electronic device which will allow optimum performance, functionability and ease of use with a vertical orientation in hand-held applications or a horizontal orientation when in fixed mount operations in a dash or on a console of a boat, plane, or car, or suspended from a user's belt.

It is a further object of the present invention to provide an electronic device which utilizes a housing which is both affixable upon a console in a horizontal alignment and is comfortably held in a vertical alignment.

It is a further object of the invention to accomplish automatic or manual transition between a vertically oriented display screen and a horizontally oriented screen as the invention is used in different applications.

These and other objects of the present invention are achieved by providing a portable electronic device which includes a housing having a front face, a base, and a back wall joined in a polyhedron configuration. The front face includes an input area having keys for data entry and a display area having a screen to illustrate information to the user. The front face, back wall, and base are joined in the polyhedron configuration with approximately a right triangular cross-section, such that the front face is presented to the user at substantially a 45° angle to horizontal when the base is mounted upon a horizontal or vertical surface (i.e. a console, dash, visor, belt, etc.). The front face, back wall, and base are joined at rounded edges to afford a smooth contour which is easily and comfortably grasped within the hand of the user. The portable electronic device further includes a sensor and/or switch to automatically and/or manually reorient the display screen between horizontal or vertical axes. The sensor or switch delivers an output to a display controller which realigns information displayed upon the view screen to shift the displayed information between vertical and horizontal configurations. The switch may simply represent an input key. The input keys within the input area include indicia identifying the function of each key, wherein the indicia are aligned at an angle with respect to the longitudinal axis of the housing. Such angular alignment of the indicia enable the indicia to be easily viewed when the housing is held within the hand of a user at a vertical alignment or mounted upon a console in a horizontal alignment. A journalled recess may be provided in the surface of the base to securely retain securing adhesive, such as VELCRO. A battery may be included to support operation absent of an external source. The back wall may include receptacles to attach the device to an external antennae and to receive data storage cards containing various forms of data and information, such as data cards, CD ROMS, disk drives, flash memories and external and internal battery chargers. The input area may include a key pad, rotary knobs, switches and the like, and any combination thereof.

BRIEF DESCRIPTION OF THE DRAWINGS

The objects and features of the invention noted above are explained in more detail with reference to the drawings, in which like reference numerals denote like elements, and in which:

FIG. 3 illustrates an end view of the present invention when horizontally aligned and mounted upon a console;

FIG. 5 illustrates a device according to the present invention when in a bottom corner mounted application;

FIG. 6 illustrates a device according to the present invention when in a top corner mounted application;

FIG. 8 illustrates a device according to the present invention when mounted to a belt of a user in a horizontal alignment with display directed outward for easy viewing;

FIG. 9 illustrates an alternative input key pad configuration for the device according to the present invention with the device mounted upon a console of a vehicle;

DETAILED DESCRIPTION OF THE INVENTION.

Figure 1:
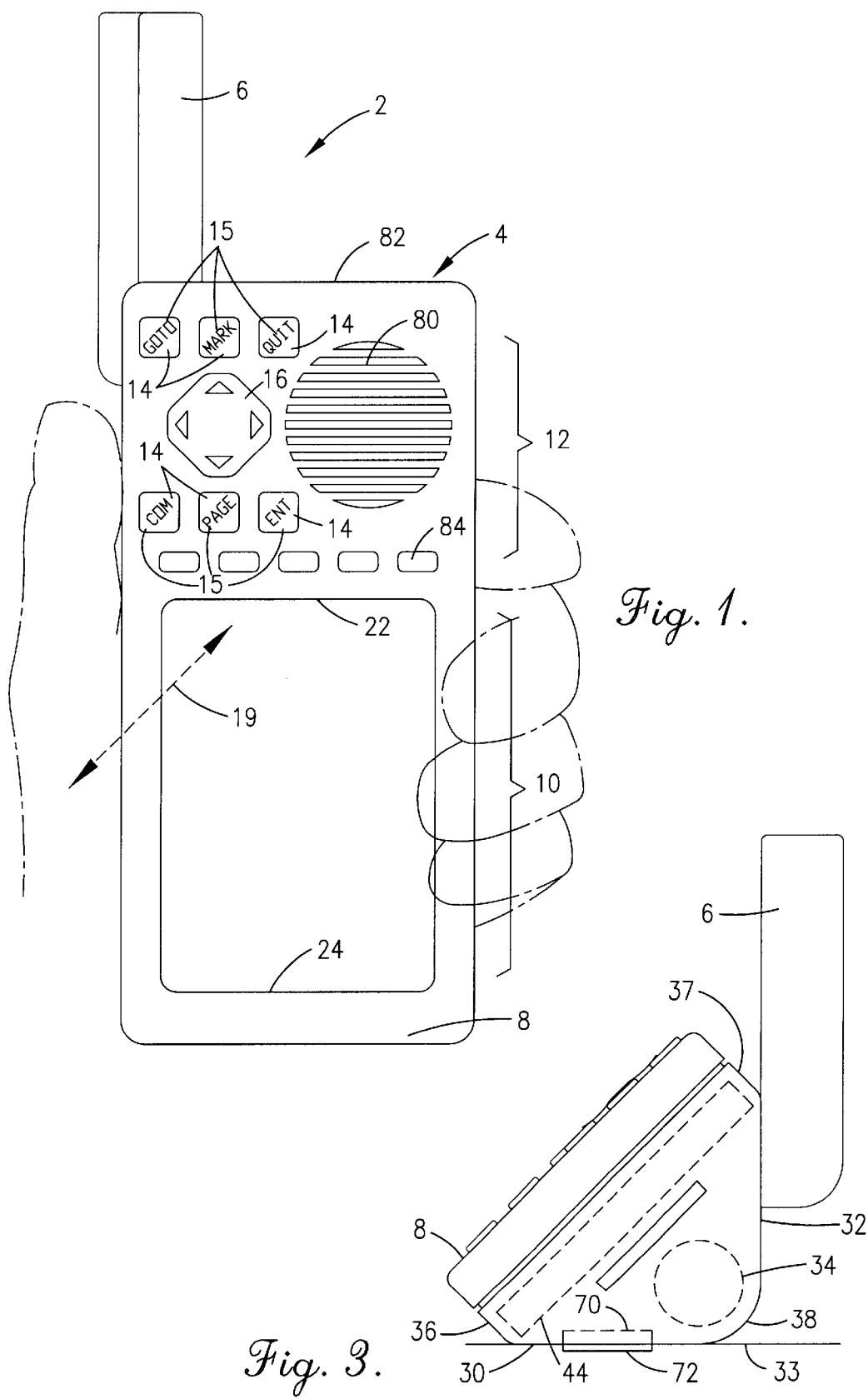
FIG. 1 illustrates a front view of a portable electronic device according to the present invention when vertically aligned to be used in a hand-held application.
Figure 2:
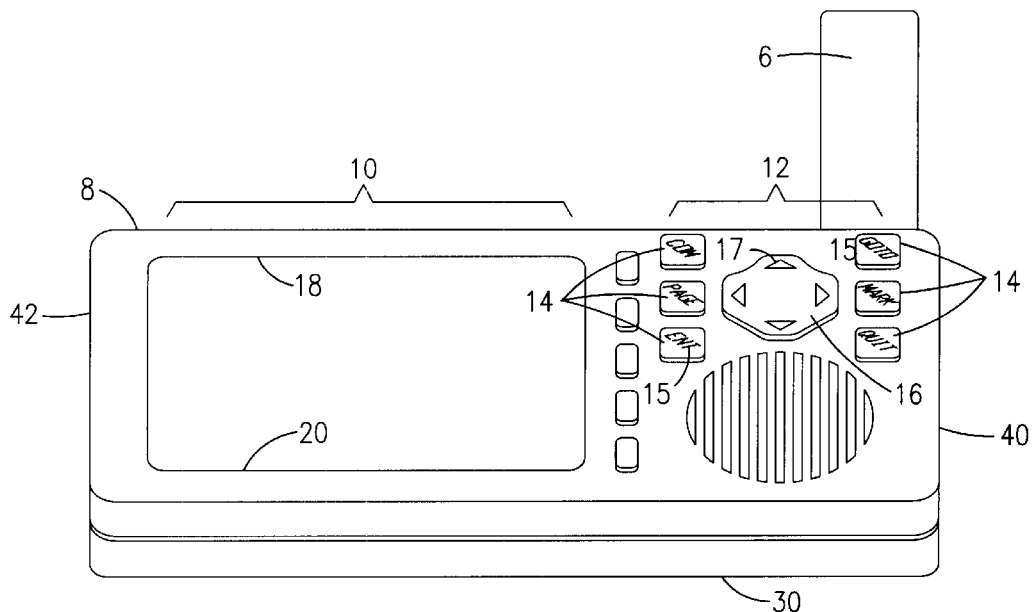
FIG. 2 illustrates a front perspective view of a portable electronic device when horizontally aligned to be mounted upon a console.

FIG. 1 illustrates a portable electronic device (generally designated by the reference numeral 2) according to the present invention. The electronic device 2 of FIG. 1 is oriented along a vertical axis, such as when held by a user. The portable device 2 includes a polyhedron-shaped housing 4 having a face plate 8, a base 30, and a back wall 32 generally forming a right triangular cross-section (as illustrated in FIG. 3). The base 30 and back wall 32 are formed generally at right angles to one another with the face plate 8 forming the hypotenuse of the triangle. The device 2 further includes an antenna 6 rotatably mounted at one corner of the housing 4 to the back wall 32. The antenna 6 is rotatable about 360° between a plurality of discrete positions, two of which are illustrated in FIGS. 1 and 2. As illustrated in FIG. 1, the antenna 6 may be positioned to extend substantially parallel to the longitudinal axis of the housing 4 during a hand-held application. As illustrated in FIG. 2, the antenna 6 may be positioned to extend at a substantially perpendicular angle to the longitudinal axis of the housing when oriented to be mounted to a console.

The face plate 8 is substantially rectangular in shape. The face plate 8 securely receives a display screen 10 and a control panel 12. The control panel 12 includes a plurality of push button type keys 14 which afford the user control over the portable device 2. Optionally, a directional toggle pad 16 may also be included within the control panel 12. In one application, such as when utilizing the portable device within a global positioning system, the toggle pad 16 affords the ability to scan through a large mapping area, portions of which are displayed within the screen 10. Optionally, the panel 12 may include a speaker 80 and a microphone 82 to afford communications. Optionally, the panel 12 may include an alignment button 84 which, when pressed by the user, reorients the display 10 between horizontal and vertical alignments.

The display screen 10 is shown located below the control panel 12 (when oriented along a vertical axis) to afford easy data entry by the user. However, the keypad could be positioned below the display instead. When oriented in the vertical alignment (FIG. 1), the display screen 10 is controlled (automatically or manually) to orient data upon the screen such that side 22 represents the top of the data displayed, while opposed side 24 represents the bottom. Thus, data is displayed from the top 22 to the bottom 24.

Turning to FIG. 2, when the housing 4 is oriented with the longitudinal axis within a substantially horizontal plane, the display screen 10 is controlled to display information such that side 18 represents the top of the data to be displayed, while opposed side 20 represents the bottom. In this manner, when horizontally aligned, data is displayed from the top 18 to the bottom 20. Hence, when the user rotates the housing 4 between a vertical application (FIG. 1) and a horizontal application (FIG. 2), the data within the display screen 10 is similarly rotated to be easily viewed by the user.

The control panel 12 has also been appended with indicia 15 to facilitate use when in vertical and horizontal alignments. In particular, each push button 14 includes indicia 15 thereon identifying the button and the function to be performed when pressed. Similarly, the directional toggle pad 16 includes indicia 17 identifying the function to be performed when the user presses upon the corners of the toggle pad 16. The indicia 15 and 17 are presented along a viewing axis (generally designated by the reference numeral 19) which forms substantially a 45° angle with respect to the longitudinal axis of the housing 4. By orienting the indicia 15 and 17 along an acutely aligned viewing axis 19, the indicia are presented to the user at a slight angle which is easily viewed, regardless of whether the housing 4 is aligned vertically or horizontally.

Turning to FIG. 3, the base 30, back wall 32, and face plate 8 adjoin one another along flat edges 36 and 37 and a rounded edge 38 to form a pentagon-shaped contour. The polyhedron-shaped housing affords an easily grasped contour which is comfortable to hold as it substantially conforms to the contour of a hand when grasped about the base 30 and back wall 32. The housing further includes top and bottom ends 40 and 42, respectively (FIG. 2). One of the top and bottom ends 40 and 42 includes an opening therethrough which communicates with a battery receptacle 34. The front plate 8, base 30, back wall 32 and ends 40 and 42 join to form a water-tight casing with seals along the corners. The front and rear case may be readily assembled in a waterproof case with gaskets and screws or through ultrasonic welding due to the planar joint between the front plate, back wall and base.

As illustrated in FIG. 3, the base 30 rests upon a mounting surface 33, such as a dash of a vehicle, a visor of a vehicle, the windshield, and the like. When placed in this horizontal alignment, the face plate 8 is aligned at a substantially 45° angle with respect to the base 30 in order to present the display screen 10 at an optimal viewing angle to a user. This viewing angle is maintained, regardless of whether the housing 30 is mounted upon a horizontal dash or console of a vehicle, affixed to a vertically aligned sun visor, or windshield above a user's head, or affixed to the cab ceiling. Optionally, the base 30 may be constructed with a recess 70 therein to adhesively receive securing means 72 which enables the portable device 2 to be securely fastened to a vertical surface, such as a sun visor. The securing means 72 may include an adhesive tape, such as VELCRO or similar means, in order to economically mount the device to a desired surface. The adhesive tape allows instantaneous removal and conversion from a dash mounted horizontal orientation to a vertical hand-held orientation. When the base 30 is affixed against a vertical surface above the user's head, the face plate 8 directs the display screen 10 downward at an easily viewed angle to the user.

As illustrated in FIG. 3, the interior of the housing securely receives circuitry 44 (generally designated in a shadow line) for controlling operation of the display screen 10 and control panel 12. The circuit 44 is aligned proximate the rear surface of the face plate 8, with the battery receptacle 34 being located along the rearmost corner (rounded section 38) of the intersection between the base 30 and the back wall 32. Batteries are retained within the receptacle 34 to afford power to the device. As a further option, the housing may include a data card receptacle 150 in one end thereof. The receptacle 150 may receive a data card 152 containing information such as mapping data, navigational data, communications data and the like. This design affords optimal use of the limited space within the housing 4, thereby reducing the size of the housing 4 and the materials necessary therefor.

Figure 4:
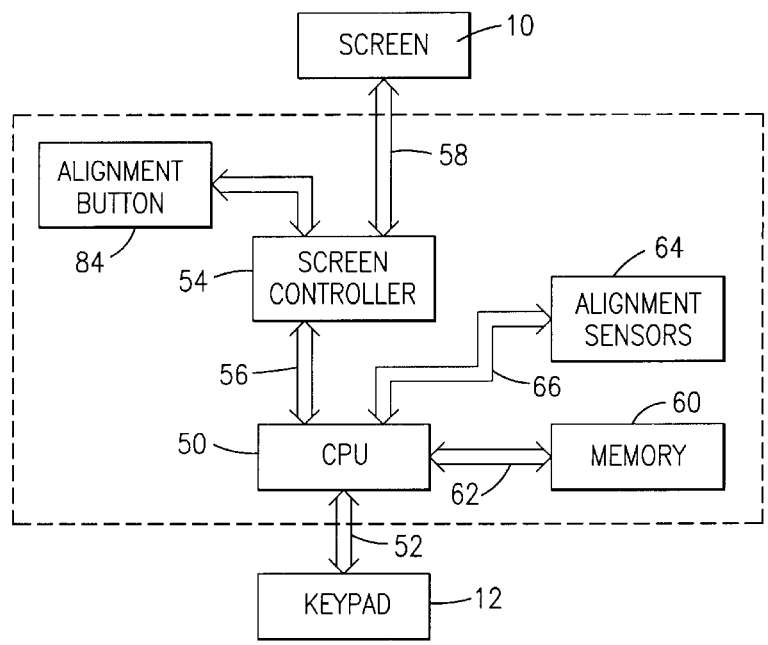
FIG. 4 illustrates a block diagram of a circuit for controlling operation of the present invention.

The circuit 44 is illustrated in block diagram form in FIG. 4. The circuit 44 includes a CPU 50 which communicates with the control panel 12 via line 52. A screen controller 54 communicates with the CPU 50 via line 56 and with the screen 10 via line 58. The circuit 44 further includes memory 60 which is accessed by the CPU 50 via lines 62. Optionally, alignment sensors 64 are also provided which deliver alignment information to the CPU 50 via line 66. The alignment sensors 64 determine whether the housing 4 is aligned along a vertical axis or a horizontal axis and inform the CPU 50 of this alignment. Once the sensors 64 determines the position of the housing with respect to horizontal, the CPU 50 directs the controller 54 to re-orient the information displayed within the screen 10 accordingly. Optionally, a manual switch 84 may be provided on the console to allow the user to manually select a desired display orientation. The switch 84 may override or replace the sensor 64. If the sensor 64 is removed, the switch 84 would provide the only source of screen realignment. Hence, when the user grasps the housing 4 in a vertical alignment, the circuit 44 realigns the display screen 10 with sides 22 and 24 representing top and bottom edges thereof. When the user alternatively places the device upon a console of a vehicle or affixes it to a visor in a horizontal alignment, the sensor 64 detects such orientation. In turn, the circuit 44 reconfigures the orientation such that information is presented upon the display screen 10 with the sides 18 and 20 representing top and bottom edges for the information to be displayed. As discussed above, regardless of whether the housing 4 is oriented vertically or horizontally, the indicia 15 and 17 are displayed at a slight angle with respect to horizontal and are easily viewed by the user in both orientations.

FIGS. 5–9 illustrate alternative embodiments and alignments for the present invention. Beginning with FIG. 5, the device is shown when mounted in a bottom corner against a back support 85 and a bottom support 86. When mounted in a bottom corner, as in FIG. 5, the back wall 32 and the base 30 are flushly mounted against the support surfaces 85 and 86. When located in a bottom corner mounted position, the front face 8 is aligned upward toward the user at substantially a 45° angle with respect to the base surface 86. optionally, the antenna 6 may be removed and a remotely located antenna substituted therefore and connected to the housing 4 via an antenna cable 87. The antenna cable 87 may include a jack on its outer end that is securely received within a receptacle 88 located in the end 40 of the housing 4. Optionally, the receptacle 87 may be located in any other surface about the housing, such as in the front plate 8, the opposite end 42, the back wall 32 or the base 30.

FIG. 6 illustrates an application whereby the device 2 is mounted to window 183 and a ceiling 182 of a vehicle cab above a console 184. The device 2 is mounted in an upper corner against an overhead support 90 and a back support 91. As in the embodiment of FIG. 5, an antenna receptacle 88 may be provided to allow a remote antenna to be attached to the device, thereby removing the antenna from the back wall 32 which is located flushly against the support surface 90. In FIG. 6, the receptacle 88 is located in the front plate 8 and receives a jack upon the end of a cable 87. The back wall 32 may include the securing means 72 therein. The display 10 is directed downward perpendicular to a line of sight (shown by shadow line 180).

Figure 7:
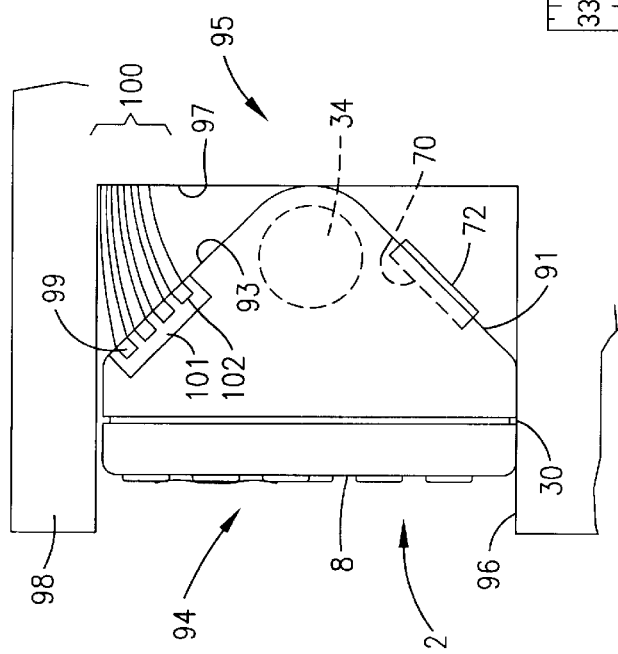
FIG. 7 illustrates a device according to the present invention when in an in-dash removable application.

FIG. 7 illustrates a cross-section of a dash-mounted application wherein the device 2 is temporarily mounted within a recess 94 in a dash 95 of a vehicle. The recess may be defined by a base 96, a rear wall 97, and an upper wall 98. Optionally, the rear wall 97 may include inner support surfaces 91 and 93 with one or more connectors 99 projecting forward therefrom. The surfaces 91 and 93 may be aligned to orient the display along a vertical plane. The connectors may be attached to cables 100 which are remotely attached to devices such as an antenna, a battery, a remote computer, memory and the like. The device 2 includes a recess 101 in its back wall 32. The recess 101 includes receptacles 102 which securely receive the connectors 99 to afford an electrical connection therebetween. When the device 2 is inserted into the recess 94, the receptacles 102 are aligned with the connectors 99 and engaged therewith. Optionally, an adhesive securing means 72 may be provided upon the base 30 (or the surfaces 91 and 93) to securely attach the housing to the base 96 (or the rear wall 97). The connectors 99 may also be attached to a remote power source which charges the batteries 34 and drives the unit while attached thereto.

FIG. 8 illustrates an application wherein the device 2 is removably attached to a belt 110 which may be secured about the waist of a user, such as a utility belt or a belt worn by a police officer. The belt 110 may include a planar support plate 112 having a height approximating that of the base 30 of the device 2. The device 2 is aligned with the face plate 8 oriented approximately at a 45° angle to a vertical plane defined by the plate 112. In this configuration, the face plate 8 is directed outward at a non-zero angle with respect to vertical, while the base 30 extends along a vertical plane. The planar support surface 112 and the base 30 may be secured to one another via adhesive means 72 which may be retained within a recess 70 in the base 30.

Optionally, the support plate 112 may include a ledge section having a triangular cross-section and extending along the bottom edge of the plate 112. The triangular ledge section may include a face forming the hypotenuse of the cross-section projecting outward from a vertical plane containing the plate 112 at substantially a 45° angle. The mounting face may securely receive the base 30 to orient the display 8 horizontally and upward along a line of sight parallel to a vertical plane, in order to enable the user to look directly downward upon the screen 10. Optionally, the ledge section may be constructed with differing cross-sections to align the face at various angles with respect to horizontal in order to align the face plate at an acute angle to horizontal. Optionally, the ledge section may be removed and the device 2 directly connected to the plate 112. The belt-mounted embodiment of FIG. 8 enables the user to view the display while standing and while sitting. The housing 4 extends about the user's waist in this application, and thus does not interfere with the user while sitting and while getting in and out of a vehicle.

FIG. 9 illustrates a perspective view of the device 2 when mounted upon a console 190. The display panel 10 is aligned along a viewing angle 180.

FIG. 9 illustrates an alternative display panel configuration 160 containing press buttons 162 and a toggle pad 164. The display panel 160 may be utilized in a GPS application. As in the first embodiment, the buttons 162 and pad 164 include indicia 163 and 165 thereon which are aligned at substantially a 45° angle with respect to the longitudinal axis of the device 2. By orienting the indicia in this manner, the indicia are easily read regardless of whether the device is oriented vertically or horizontally.

Figure 10:
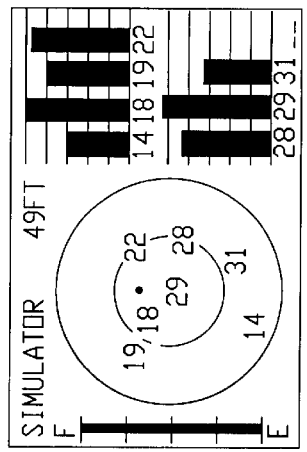
FIG. 10 illustrates exemplary satellite page information displayed in horizontal and vertical formats.

FIG. 10 generally illustrates horizontally and vertically oriented displays presented by the present invention. As shown in FIG. 10, the graphic and textual information is re-oriented and repositioned between the horizontal and vertical alignments to optimize space and to present the information in an easily viewed manner. The information displayed within FIG. 10 corresponds to an application in which the present invention is utilized as a satellite navigational tool.

Figure 11:
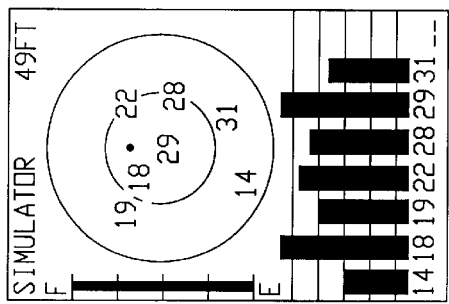
FIG. 11 illustrates exemplary position page information displayed in horizontal and vertical formats.

FIG. 11 illustrates an exemplary manner in which position data is presented to a user in horizontal and vertical alignments. The data is reformatted between the horizontal and vertical alignments to again maximize the space usage and present the data in an easily viewed manner.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A portable global positioning device capable of mounted and hand held operation, the device comprising:
   a first side;
   a second side;
   a first flat edge joining the first side and the second side;
   a third side;
   a second flat edge joining the first side and the third side;
   a round edge joining the second side and the third side, wherein the first, second, and third sides form a triangular-shaped cross-section;
   a display screen positioned on one of the first, second, and third sides; and
   a control panel.

2. The device according to claim 1 further comprising:
   a top end joined to the first, second, and third sides;
   a bottom end joined to the first, second, and third sides opposite the top end; and
   a battery receptacle opening to one of the top end and bottom end.

3. The device according to claim 1 wherein the round edge is opposite the display screen and control panel.

4. The device according to claim 1 further comprising a battery receptacle located adjacent to the rounded edge.

5. The device according to claim 1 further comprising means for affixing the device to a surface, the affixing means being provided on at least one of the first, second, and third sides.

6. The device according to claim 1 further comprising means for mounting the device on at least one of the flat edges.

7. The device according to claim 1, wherein the display screen is located vertically below the control panel when held upright in a user's hand.

8. The device according to claim 1, wherein said control panel is positioned on at least one of said first, second, and third sides.

9. In a portable global positioning device, including a housing having a front face with a display screen, the improvement comprising:

said housing having a first side, a second side, and a third side joined in a polyhedron-shaped configuration, said first side containing the display screen and at least one of said second and third sides forming a base to support said housing when horizontally oriented, wherein said second side and said third side intersect at approximately 90°;

a control panel;

wherein said first, second, and third sides adjoin to form a triangular-shaped cross-section with the second and third sides forming legs of said triangular shape, and wherein said first side is positioned at an angle of approximately 45° relative to each of said second and third sides.

10. The device according to claim 9, wherein said control panel is positioned on at least one of said first, second, and third sides.

* * * * *